(12) United States Patent
Nikaku

(10) Patent No.: US 9,100,510 B2
(45) Date of Patent: Aug. 4, 2015

(54) IMAGE READING APPARATUS AND IMAGE FORMING APPARATUS

(75) Inventor: Daisuke Nikaku, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 311 days.

(21) Appl. No.: 13/562,588

(22) Filed: Jul. 31, 2012

(65) Prior Publication Data

US 2013/0044338 A1    Feb. 21, 2013

(30) Foreign Application Priority Data

Aug. 16, 2011    (JP) ................................ 2011-178097

(51) Int. Cl.
*H04N 1/04* (2006.01)
*H04N 1/00* (2006.01)
*H04N 1/407* (2006.01)

(52) U.S. Cl.
CPC ......... *H04N 1/00013* (2013.01); *H04N 1/0005* (2013.01); *H04N 1/00031* (2013.01); *H04N 1/00045* (2013.01); *H04N 1/00063* (2013.01); *H04N 1/00087* (2013.01); *H04N 1/4076* (2013.01); *H04N 2201/0081* (2013.01)

(58) Field of Classification Search
USPC .................. 358/516, 509, 504, 475; 382/274
See application file for complete search history.

(56) References Cited

U.S. PATENT DOCUMENTS

2007/0177224 A1* 8/2007 Ikeno et al. .................... 358/474
2011/0102863 A1* 5/2011 Nakashima ................... 358/475

FOREIGN PATENT DOCUMENTS

| JP | 8-251355 | 9/1996 |
|---|---|---|
| JP | 10-108020 | 4/1998 |
| JP | 2006-67029 | 3/2006 |
| JP | 2006-165786 | 6/2006 |
| JP | 2007-081696 | 3/2007 |
| JP | 2007-201886 | 8/2007 |
| JP | 2008-103826 | 5/2008 |
| JP | 2010-004444 | 1/2010 |
| JP | 2010-004445 | 1/2010 |
| JP | 2010-004446 | 1/2010 |
| JP | 2010-34847 | 2/2010 |

OTHER PUBLICATIONS

Office Action issued May 12, 2015 in Japanese Patent Application No. 2011-178097.

* cited by examiner

*Primary Examiner* — Marivelisse Santiago Cordero
*Assistant Examiner* — Kent Yip
(74) *Attorney, Agent, or Firm* — Oblon, McClelland, Maier & Neustadt, L.L.P.

(57) ABSTRACT

An image reading apparatus include a light source; an image sensor configured to output an image signal of an object illuminated by the light source; a first calculating unit configured to calculate a third light amount based on a difference between a first image signal output from the image sensor when the light source illuminates a reference member as the object at a first light quantity and a second image signal output from the image sensor when the light source illuminates the reference member at a second light quantity and a difference between the first light quantity and the second light quantity; and a light quantity setting unit configured to set a light quantity at which the light source illuminates a document as the object to the third light quantity.

9 Claims, 11 Drawing Sheets

IMAGE READING APPARATUS AND IMAGE FORMING APPARATUS

CROSS-REFERENCE TO RELATED APPLICATION

The present application claims priority to and incorporates by reference the entire contents of Japanese Patent Application No. 2011-178097 filed in Japan on Aug. 16, 2011.

BACKGROUND OF THE INVENTION

1. Field of the Invention

The present invention relates to an image reading apparatus and an image forming apparatus.

2. Description of the Related Art

Conventionally, there is known an image reading apparatus for optically reading image information of a document. The image reading apparatus of this type uses a light source extended in a main scanning direction which is orthogonal to a conveying path of the document to irradiate the document with light and receive light reflected by the irradiated document by means of an image sensor to read an image of the document. In recent years, moreover, there is practically used an image reading apparatus of a contact image sensor (CIS) type which uses a light emitting diode (LED) taking a small shape as a light source to form an image on a line sensor through an optical system of same magnification imaging in order to reduce a size of the apparatus.

The image reading apparatus generally carries out a gain adjustment and AD conversion over an analog image signal of a document which is output from an image sensor by an analog front end (AFE) circuit, and performs a predetermined image processing through a digital image processing circuit and then stores the signal in a frame memory. In order to enhance tone reproducibility (resolution) of a digital image signal subjected to the AD conversion, thereby obtaining an image of high quality, it is desirable to carry out such an adjustment as to enable a maximum utilization of a dynamic range for the AD conversion. The adjustment is generally executed by a method of amplifying an analog image signal within a range in which the digital image signal subjected to the AD conversion is not saturated through the gain adjustment to be performed in a former stage of the AD conversion.

When the analog image signal is amplified by the gain adjustment, however, a noise component of a black level included in the analog image signal or the like is also amplified in the same gain, resulting in reduction in S/N. Therefore, the inventor proposes a method of regulating a light quantity of a light source which can utilize a dynamic range for the AD conversion at a maximum (see Japanese Patent Application laid-open No. 2007-81696).

In the technique described in Japanese Patent Application laid-open No. 2007-81696, a light quantity of a light source is regulated in such a manner that a peak value of an image signal output from an image sensor reaches a target value determined depending on a reflectance of a reference white plate when the reference white plate illuminated at a predetermined light quantity is read. More specifically, it is assumed that the image signal of the reference white plate has a peak value of 150, the target value is 200 and the black level included in the image signal (the output of the image sensor in a light quantity of zero) is 10 when the predetermined light quality is set to be one. In this case, the light quantity of the light source is regulated to be approximately 1.36 times as large as the predetermined light quantity by $(200-10)/(150-10) \approx 1.36$.

According to the technique described in Japanese Patent Application laid-open No. 2007-81696, only a signal component of an image signal can be increased within a range in which a digital image signal subjected to the AD conversion is not saturated, and a dynamic range for the AD conversion can be utilized at a maximum. Therefore, it is possible to enhance tone reproducibility of a digital image signal subjected to the AD conversion without deteriorating S/N.

Referring to the technique described in Japanese Patent Application laid-open No. 2007-81696, it is assumed that the black level included in the image signal is constant. However, in the case of a structure in which outputs of sensor chips arranged in a main scanning direction are synthesized to obtain an image signal corresponding to one main scanning line, for example, the image reading apparatus of the CIS type described above, the black level is varied every sensor chip due to an individual difference of an output buffer provided in each of the sensor chips or the like. In the case in which a CMOS sensor is used as the sensor chip, moreover, the black level is varied every pixel because the CMOS sensor has an output buffer for each pixel and each output buffer has an individual difference. For this reason, it is impossible to optimize a light quantity of a light source through an exact application of the technique described in Japanese Patent Application laid-open No. 2007-81696.

A range of a variation in the black level is determined for each sensor chip. By assuming a maximum black level which might be generated, therefore, it is also possible to regulate the light quantity of the light source which applies the technique described in Japanese Patent Application laid-open No. 2007-81696. In this case, however, the dynamic range for the AD conversion cannot be sufficiently utilized effectively. On the other hand, in some cases in which a value of the black level is assumed to be smaller than a value of a maximum black level to regulate the light quantity of the light source, the digital image signal subjected to the AD conversion is saturated, resulting in a deterioration in picture quality when reading a document having a high reflectance.

Therefore, there is a need for an image reading apparatus and an image forming apparatus capable of optimizing a light quantity of a light source irrespective of a magnitude of a black level included in an image signal.

SUMMARY OF THE INVENTION

It is an object of the present invention to at least partially solve the problems in the conventional technology.

According to an embodiment, there is provided an image reading apparatus that includes a light source; an image sensor configured to output an image signal of an object illuminated by the light source; a first calculating unit configured to calculate a third light amount based on a difference between a first image signal output from the image sensor when the light source illuminates a reference member as the object at a first light quantity and a second image signal output from the image sensor when the light source illuminates the reference member at a second light quantity and a difference between the first light quantity and the second light quantity; and a light quantity setting unit configured to set a light quantity at which the light source illuminates a document as the object to the third light quantity.

According to another embodiment, there is provided an image forming apparatus that includes the image reading apparatus according to the above embodiment; and an image forming unit configured to form an image based on the image signal of the document output from the image sensor of the image reading apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The preferred embodiment of an image reading apparatus and an image forming apparatus according to the present invention will be described below in detail with reference to the accompanying drawings. Although the following embodiments are examples in which the present invention is applied to a copying machine, the present invention is not restricted to a configuration which will be illustrated below but can be executed in various configurations without departing from the gist of the present invention.

First Embodiment

Figure 1:
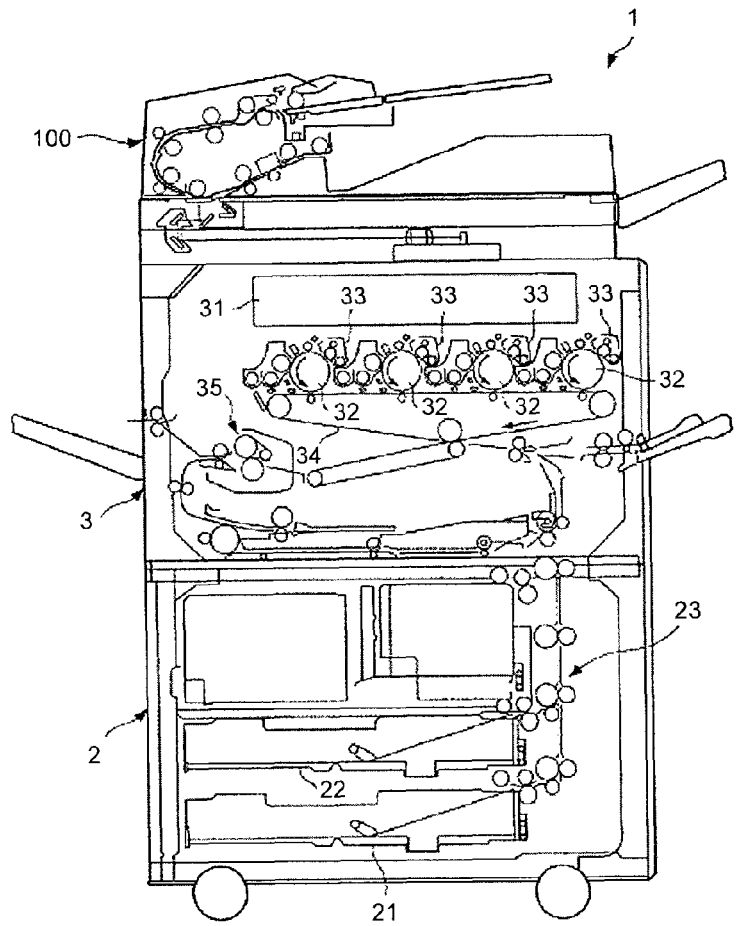
FIG. 1 is a view illustrating a schematic structure of a copying machine according to a first embodiment.

FIG. 1 is a view illustrating a schematic structure of a copying machine 1 according to a first embodiment. As illustrated in FIG. 1, the copying machine 1 includes an automatic document feeder (ADF) 100 having a function of an image reading apparatus, a paper feeding unit 2 and an image forming unit 3.

The paper feeding unit 2 has paper feeding cassettes 21 and 22 for accommodating recording papers having different paper sizes, and a paper feeder 23 constituted by various rollers for feeding the recording papers accommodated in the paper feeding cassettes 21 and 22 to an image forming position of the image forming unit 3.

The image forming unit 3 includes an exposing device 31, photosensitive drums 32, developing devices 33, a transfer belt 34 and a fixing device 35. The image forming unit 3 exposes each of the photosensitive drums 32 by the exposing device 31 to form a latent image on the photosensitive drum 32 based on image data of a document read by an image reading unit in the ADF 100, and supplies toners having different colors to the respective photosensitive drums 32 through the developing devices 33, thereby carrying out a development. The image forming unit 3 transfers an image developed onto the photosensitive drums 32 by means of the transfer belt 34 to the recording paper fed from the paper feeding unit 2 and then melts the toner of a toner image transferred onto the recording paper by means of the fixing device 35, thereby fixing a color image to the recording paper.

Figure 2:
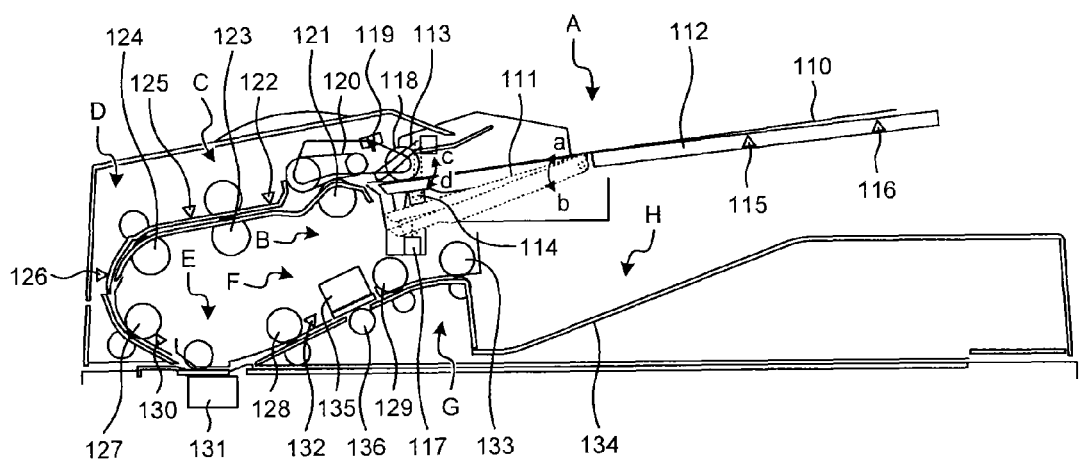
FIG. 2 is a view illustrating a detailed structure of an ADF provided in the copying machine.
Figure 3:
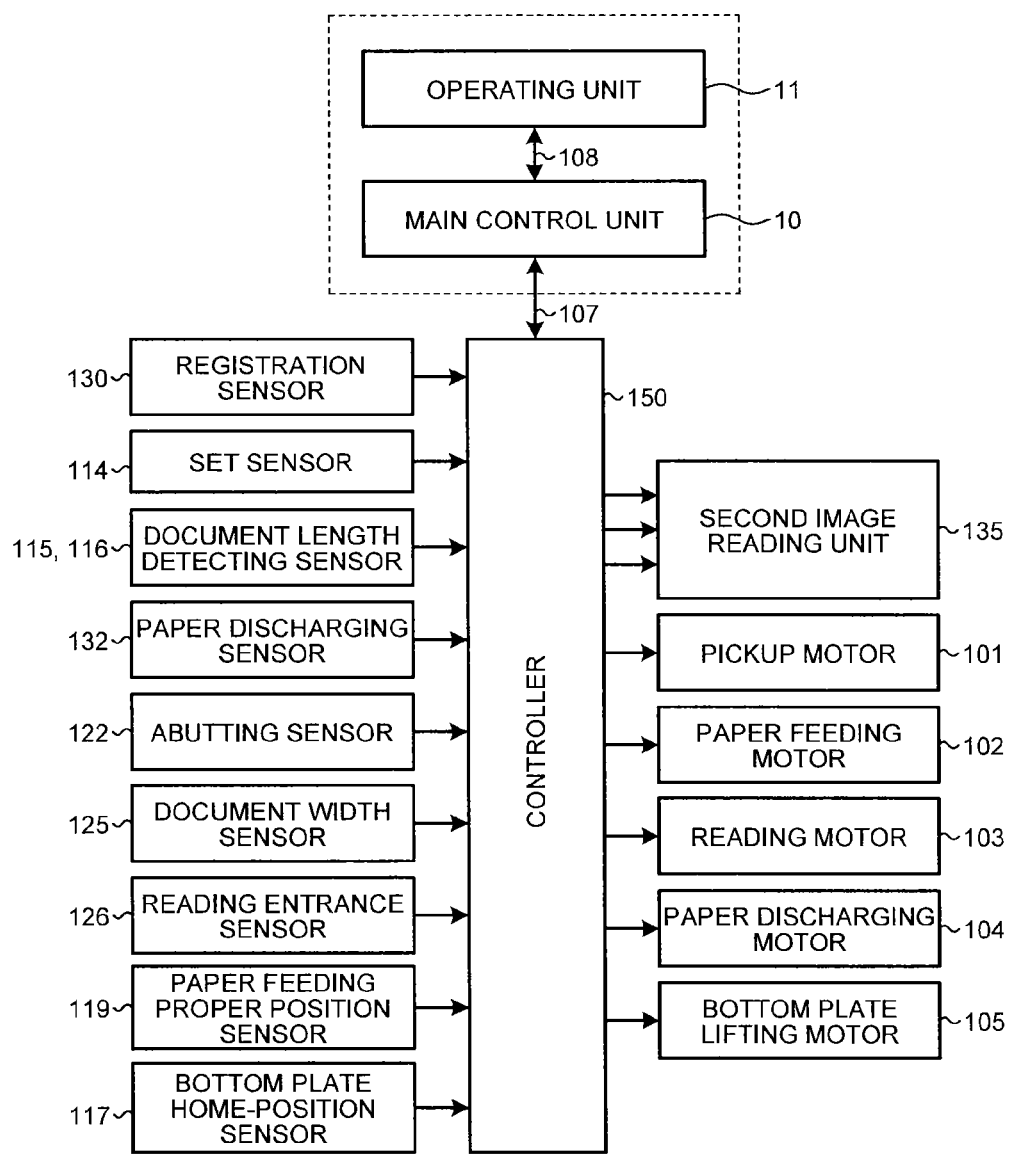
FIG. 3 is a block diagram illustrating a control system of the ADF.

FIG. 2 is a view illustrating a detailed structure of the ADF 100 and FIG. 3 is a block diagram illustrating a control system of the ADF 100. As illustrated in FIG. 2, the ADF 100 includes a document set unit A to which a bundle of documents 110 is set, a separation feeding unit B for separating and feeding documents one by one from the set bundle of documents 110, a registration unit C for carrying out abutting and aligning over the fed document and pulling out and feeding the document subjected to the aligning, a turn unit D for turning the document to be fed and feeding a document surface toward a reading side (downward in the drawing) through a first image reading unit 131, a first read feeding unit E for reading a front side image of the document through the first image reading unit 131 from below a contact glass, a second read feeding unit F for reading, through a second image reading unit 135, a back side image of the document from which the front side image is read, a paper discharging unit G for discharging, to an outside of the apparatus, the document from which images on both sides are completely read, and a stack unit H for stacking and storing the discharged documents.

Moreover, the ADF 100 includes motors 101 to 105 for carrying out driving in each of the portions and a controller 150 for controlling a serial operation as illustrated in FIG. 3. The controller 150 is connected to a main control unit 10 for controlling the whole copying machine 1 through an I/F 107. Moreover, an operating unit 11 for carrying out various operations by a user is connected to the main control unit 10 through an I/F 108.

The bundle of documents 110 to be read is set into the document set unit A. The bundle of documents 110 is set onto a document table 112 including a movable document table 111. The bundle of documents 110 is set onto the document table 112 with the side to be read being turned upward. At this time, the bundle of documents 110 is aligned in an orthogonal direction to a feeding direction by means of a side guide which is not illustrated.

Moreover, the setting of the bundle of documents 110 is detected by a set feeler 113 and a set sensor 114, information indicating that the bundle of documents 110 is set is transmitted from the controller 150 to the main control unit 10 through the I/F 107.

Furthermore, a rough length in the feeding direction of the bundle of documents 110 is determined by document length detecting sensors 115 and 116 provided on a document table surface. A reflection type sensor or a sensor of an actuator type which can detect a single document is used for the document length detecting sensors 115 and 116, for example. Moreover, it is necessary to arrange the document length detecting sensors 115 and 116 so as to determine whether they are arranged lengthwise or widthwise in at least a same document size.

The movable document table 111 has such a structure as to move vertically in a and b directions of FIG. 2 by means of a bottom plate lifting motor 105. When the bundle of documents 110 is not set onto the document table 112, the movable document table 111 is in a falling state which is detected by a bottom plate home-position sensor 117. When the controller 150 detects that the bundle of documents 110 is set onto the document table 112 by means of the set feeler 113 and the set sensor 114, the movable document table 111 is lifted in such a manner that the bottom plate lifting motor 105 is normally rotated to cause an uppermost face of the bundle of documents 110 to come in contact with a pickup roller 118 of the separation feeding unit B. The pickup roller 118 is moved in c and d directions of FIG. 2 by the action of a cam mechanism by means of the pickup motor 101, and furthermore, the movable document table 111 is lifted and pressed by the upper face of the bundle of documents 110 provided on the movable document table 111 and is thus lifted in the c direction of FIG. 2 so that an upper limit is detected by a paper feeding proper position sensor 119.

When a print key of the operating unit 11 is pushed down by the user so that a document feeding signal is transmitted from the main control unit 10 to the controller 150 through the I/F 107, a roller of the pickup roller 118 is rotated and driven by a normal rotation of the paper feeding motor 102 and the pickup roller 118 thus picks up several documents (ideally one document) put on the document table 112. A rotating direction indicates a direction in which an uppermost document is fed to a paper feeding entrance.

A paper feeding belt 120 is driven in a paper feeding direction by the normal rotation of the paper feeding motor 102. Moreover, a reverse roller 121 is rotated and driven in a direction opposite to the direction the paper feeding by the normal rotation of the paper feeding motor 102. Consequently, there is obtained a structure in which the uppermost document is separated from the document(s) put just thereunder and only the uppermost document can be thus fed. More detailed description will be given. The reverse roller 121 comes in contact with the paper feeding belt 120 at a predetermined pressure, and is rotated in a counterclockwise direction with the rotation of the paper feeding belt 120 in a state in which it comes in contact with the paper feeding belt 120 directly or through a single document. On the other hand, when at least two documents enter a portion between the paper feeding belt 120 and the reverse roller 121, a turning force is set to be smaller than a torque of a torque limiter, and the reverse roller 121 is rotated in a clockwise direction to be an original driving direction to push the extra document back. Consequently, the multiple documents are prevented from being fed.

The document separated into one by the action of the paper feeding belt 120 and the reverse roller 121 is transmitted toward the registration unit C side by means of the paper feeding belt 120 and a leading end is detected by an abutting sensor 122, and then, further advances to abut against a pull-out roller 123 which is stopped. Thereafter, the document is fed by a defined distance in a predetermined quantity from the detection of the abutting sensor 122 and then the paper feeding motor 102 is stopped in a state where the document abuts against the pull-out roller 123 with a flexure of a predetermined quantity. Consequently, a driving operation of the paper feeding belt 120 is stopped. At this time, the pickup motor 101 is rotated to retract the pickup roller 118 from the upper face of the document, thereby feeding the document by only the feeding force of the paper feeding belt 120 so that the leading end of the document enters a nip between upper and lower rollers of the pull-out roller 123 and the leading end is thus aligned (skew correction).

The pull-out roller 123 has the skew correcting function, and furthermore, serves to feed the document subjected to the skew correction after the separation to an intermediate roller 124 and is driven by the reverse rotation of the paper feeding motor 102. Although the pull-out roller 123 and the intermediate roller 124 are driven in the reverse rotation of the paper feeding motor 102, moreover, the pickup roller 118 and the paper feeding belt 120 are not driven.

A plurality of document width sensors 125 is arranged and provided in a direction perpendicular to the sheet of FIG. 2 and detects a size in a widthwise direction which is orthogonal to the feeding direction of the document fed by the pull-out roller 123. Moreover, a length of the document in the feeding direction is detected from a motor pulse by reading the leading and trailing edges of the document through the abutting sensor 122.

When the document is fed from the registration unit C to the turn unit D by the driving operations of the pull-out roller 123 and the intermediate roller 124, a feeding speed in the registration unit C is set to be higher than a feeding speed in a first read feeding unit E, thereby shortening a processing time required for feeding the document into the document reading unit. When the leading end of the document is detected by a reading entrance sensor 126, deceleration is started to cause the document feeding speed to be equal to the read feeding speed before the leading end of the document enters the nip between the upper and lower rollers of a reading entrance roller 127, and at the same time, the reading motor 103 is normally driven to drive the reading entrance roller 127, a reading exit roller 128 and a CIS exit roller 129. When detecting the leading end of the document through a registration sensor 130, the controller 150 reduces the feeding speed of the document at a predetermined feeding distance to temporarily stop the document on this side of the first image reading unit 131, and furthermore, to transmit a registration stopping signal to the main control unit 10 through the I/F 107.

When a reading start signal is transmitted from the main control unit 10 to the controller 150 through the I/F 107, subsequently, the controller 150 carries out an acceleration to increase a predetermined feeding speed until the leading end of the document reaches the position of the first image reading unit 131, thereby feeding the document subjected to the registration stopping. At this time, the position of the leading end of the document is detected by pulse counting of the reading motor 103 and a gate signal indicative of an effective image region in a sub-scanning direction (the same direction as the feeding direction of the document) of the surface of the document is transmitted to the main control unit 10 in such a timing that the leading end of the document reaches the first image reading unit 131. The gate signal is transmitted continuously until the trailing end of the document completely passes through the first image reading unit 131. A surface image of the document is read by the first image reading unit 131 while the document is driven by the driving operations of the reading entrance roller 127 and the reading exit roller 128.

In the case of single-sided document reading, the document from which the surface image is completely read by the first image reading unit 131 of the first read feeding unit E exactly passes through the second read feeding unit F and is thus fed to the paper discharging unit G. In this case, when detecting the leading end of the document by a paper discharging sensor 132, the controller 150 is normally driven to rotate a paper discharging roller 133 in a counterclockwise direction. Moreover, the controller 150 reduces the driving speed of the paper discharging motor just before the trailing end of the document completely passes through the nip between the upper and lower rollers of the paper discharging roller 133 through the pulse counting of the paper discharging motor 104 from the detection of the leading end of the document by means of the paper discharging sensor 132, and thus controls to prevent the jump-out of the document to be discharged onto a paper discharging tray 134 of the stack unit H.

On the other hand, in the case of double-sided document reading, the leading end of the document is detected by the paper discharging sensor 132 and the position of the leading end of the document which is being fed is then detected through the pulse counting of the reading motor 103, and a gate signal indicative of an effective image region in the sub-scanning direction of the back side of the document is transmitted from the controller 150 to the second image reading unit 135 in such a timing that the leading end of the document reaches the position of the second image reading unit 135 of the second read feeding unit F. The gate signal is transmitted continuously until the trailing end of the document completely passes through the second image reading unit 135. Then, an image on the back side of the document is read by the second image reading unit 135 through a document flow reading method (sheet-through reading) while the document is fed by the driving operations of the reading exit roller 128 and the CIS exit roller 129.

A second reading roller 136 disposed opposite to the second image reading unit 135 serves to suppress a lift of the document in the second image reading unit 135, and at the same time, to function as a reference white member. In other words, when a light quantity regulating operation for regulating the light quantity of a light source unit 200 (see FIG. 4) in the second image reading unit 135 is to be carried out, the surface of the second reading roller 136 is utilized as the reference white member to read the reference white member. The reference white member has a uniform high reflectance in a full region which is read by the second image reading unit 135. An image signal obtained by reading the reference white member by the second image reading unit 135 becomes a flat signal in which an output level is equal in the full reading region if there is no illuminance unevenness of an illumination or a variation in a black level. The image signal obtained by reading the reference white member through the second image reading unit 135 is also utilized as shading data in order to carry out a white shading correction in addition to the regulation of the light quantity of the light source unit 200. Also in the case in which the illuminance unevenness is caused by the white shading correction, an error of the image signal is corrected by the influence of the illuminance unevenness.

In the copying machine 1 according to the first embodiment, the second image reading unit 135 of the ADF 100 is constituted as an image reading device for reading a document by the CIS method. A structure of a control system related to the second image reading unit 135 and the second image reading unit 135 will be described in further detail.

Figure 4:
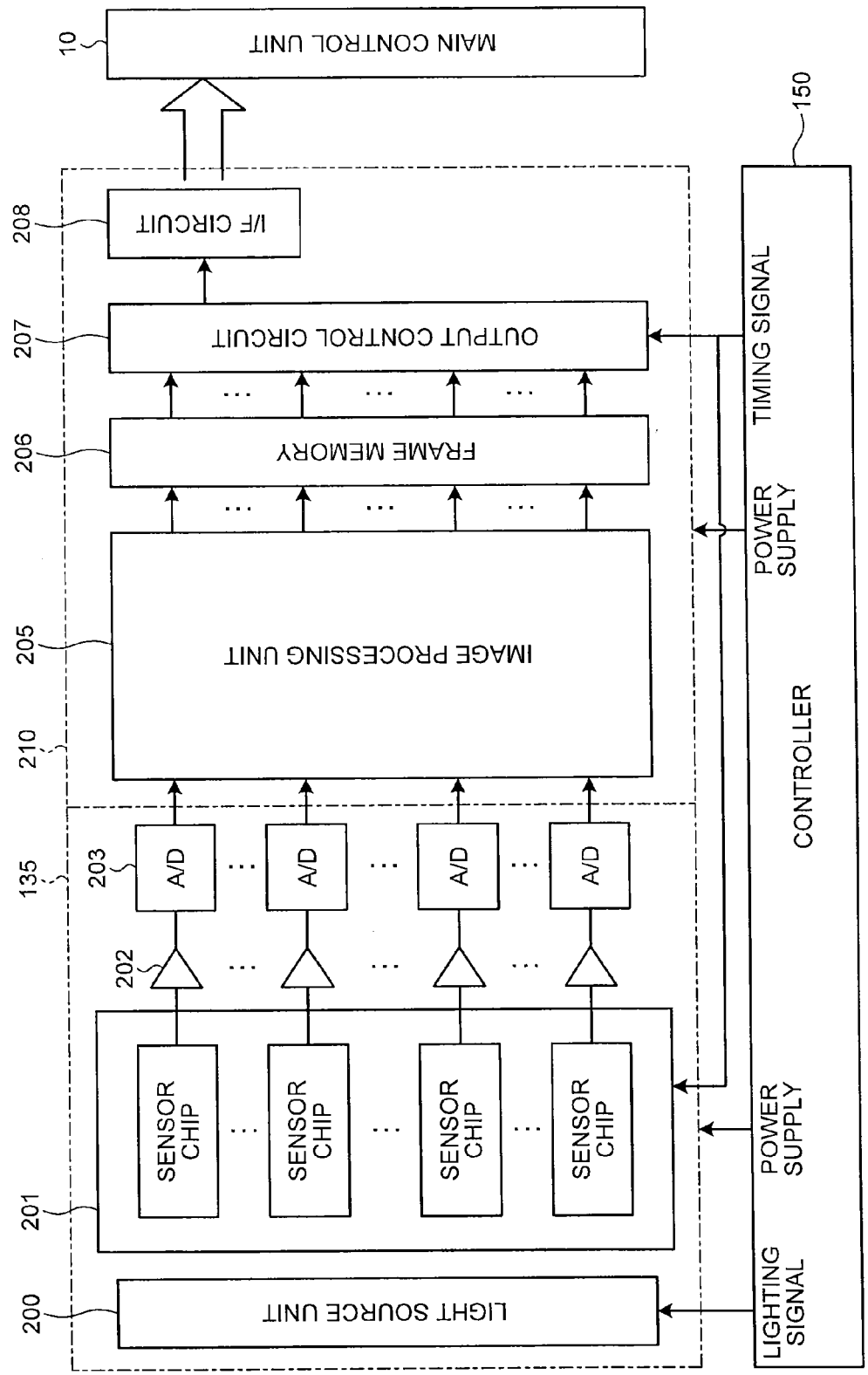
FIG. 4 is a diagram for explaining a main part of an electric circuit related to a second image reading unit of the ADF.

FIG. 4 is a diagram for explaining a main part of an electric circuit related to the second image reading unit 135. As illustrated in FIG. 4, the second image reading unit 135 includes the light source unit 200 constituted by an LED array or the like, a line sensor 201 in which a plurality of sensor chips is arranged in a main-scanning direction (corresponding to the widthwise direction of the document), a plurality of amplifier circuits 202 which is individually connected to the respective sensor chips of the line sensor 201, and a plurality of A/D converters 203 connected to the respective amplifier circuits 202. Each of the sensor chips provided in the line sensor 201 is referred to as a same magnification contact image sensor and includes a plurality of photoelectric converting elements arranged linearly in the main-scanning direction corresponding to the respective pixels and a condenser lens.

Moreover, an output of the second image reading unit 135 is connected to a digital signal processing unit 210. The digital signal processing unit 210 includes an image processing unit 205 that receives an output signal of the A/D converter 203 to generate image data of a document, a frame memory 206 that stores therein image data generated by the image processing unit 205 for each frame, an output control circuit 207 that controls an output of image data, and an I/F circuit 208.

In the ADF 100, a lighting-on signal is sent from the controller 150 to the light source unit 200 prior to the entrance of the document to a reading position through the second image reading unit 135 (an opposed position to a reading surface of the second image reading unit 135). Consequently, the light source unit 200 is turned on and irradiates the document entering the reading position of the second image reading unit 135 (the opposed position to the reading surface). Light reflected by the document is collected into the photoelectric converting elements by the condenser lens and is read as image information in each of the sensor chips provided in the line sensor 201. An image signal read by each of the sensor chips of the line sensor 201 is amplified by the amplifier circuit 202, and is then converted into digital data by the A/D converter 203.

The digital data output from the A/D converter 203 are input to the image processing unit 205. In the image processing unit 205, a black correction (black shading correction), a white shading correction or the like is carried out over the input digital data and the digital data are then stored as image data of the document in the frame memory 206 temporarily.

Thereafter, the image data on the document stored in the frame memory 206 are converted into a data format which can be accepted by the main control unit 10 through the output control circuit 207 and are then output to the main control unit 10 via the I/F circuit 208.

The operations of the second image reading unit 135 and the digital signal processing unit 210 are mainly controlled by the controller 150. For example, the controller 150 outputs a timing signal for giving a timing (image data after the timing are treated as effective data) for the leading end of the document to reach the reading position through the second image reading unit 135, a timing signal for driving each of the sensor chips of the line sensor 201 (which will be described as "XLSYNC"), a lighting signal of the light source unit 200 (which will be described as "LED_ON") or the like, for example, thereby controlling the operations of the second image reading unit 135 and the digital signal processing unit 210. Moreover, the power supply to the second image reading unit 135 or the digital signal processing unit 210 is carried out under control of the controller 150.

Figure 5:
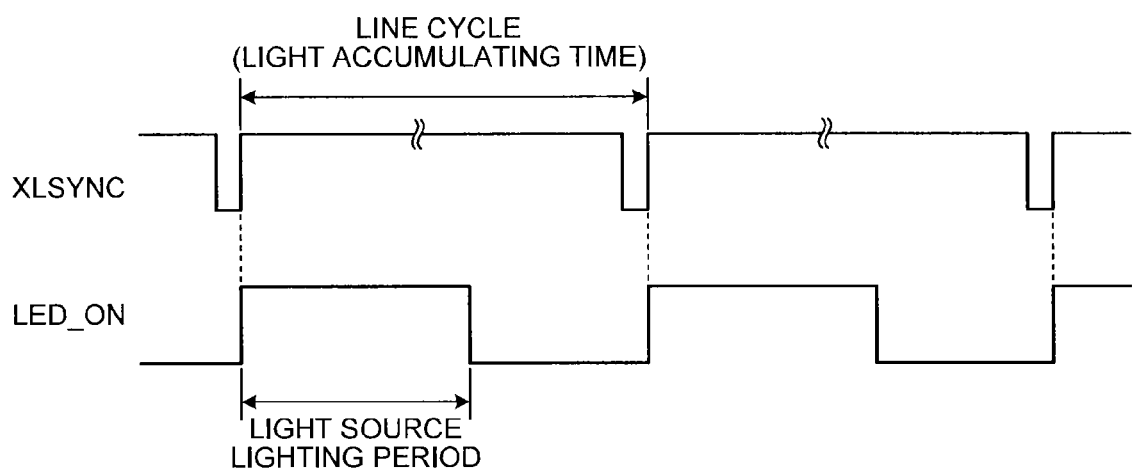
FIG. 5 is a diagram for explaining an example of a method of controlling a light quantity of a light source unit.

Description will be given to a specific example of a method of controlling a light quantity of the light source unit 200 in the second image reading unit 135. FIG. 5 is a diagram for explaining an example of the method of controlling the light quantity of the light source unit 200. The "XLSYNC" in FIG. 5 is a synchronizing signal for one line and has a logical low ("L") level for a period corresponding to several pixels on a head of a line. One cycle of the "XLSYNC" is a line cycle and is equivalent to a light accumulating time for each of the sensor chips of the line sensor 201. Moreover, the "LED_ON" in FIG. 5 is a signal having a logical high ("H") level for a lighting period of the light source unit 200 (in the present embodiment, it is assumed that an LED array is used for the light source unit 200) synchronously with a rise in the "XLSYNC". An assertion period for which the "LED_ON" has the "H" level is equivalent to the lighting period of the light source unit 200.

The control of the light quantity of the light source unit 200 is implemented by regulating the assertion period of the "LED_ON". The "LED_ON" is generated based on a reference clock in the controller 150. It is possible to regulate the assertion period of the "LED_ON" by providing a register for setting a clock number in the controller 150 and adjusting the clock number to be set to the register in a structure in which the "LED_ON" is asserted while reference clocks corresponding to the clock number set to the register is counted. In other words, it is possible to prolong a lighting period of the light source unit 200, thereby increasing the light quantity by increasing the clock number to be set to the register, and to shorten the lighting time for the light source unit 200, thereby decreasing the light quantity by decreasing the clock number to be set to the register.

By taking a specific example, next, detailed description will be given to the regulation of the light quantity of the light source unit 200 for effectively utilizing the dynamic range for the AD conversion through the A/D converter 203.

Figure 6:
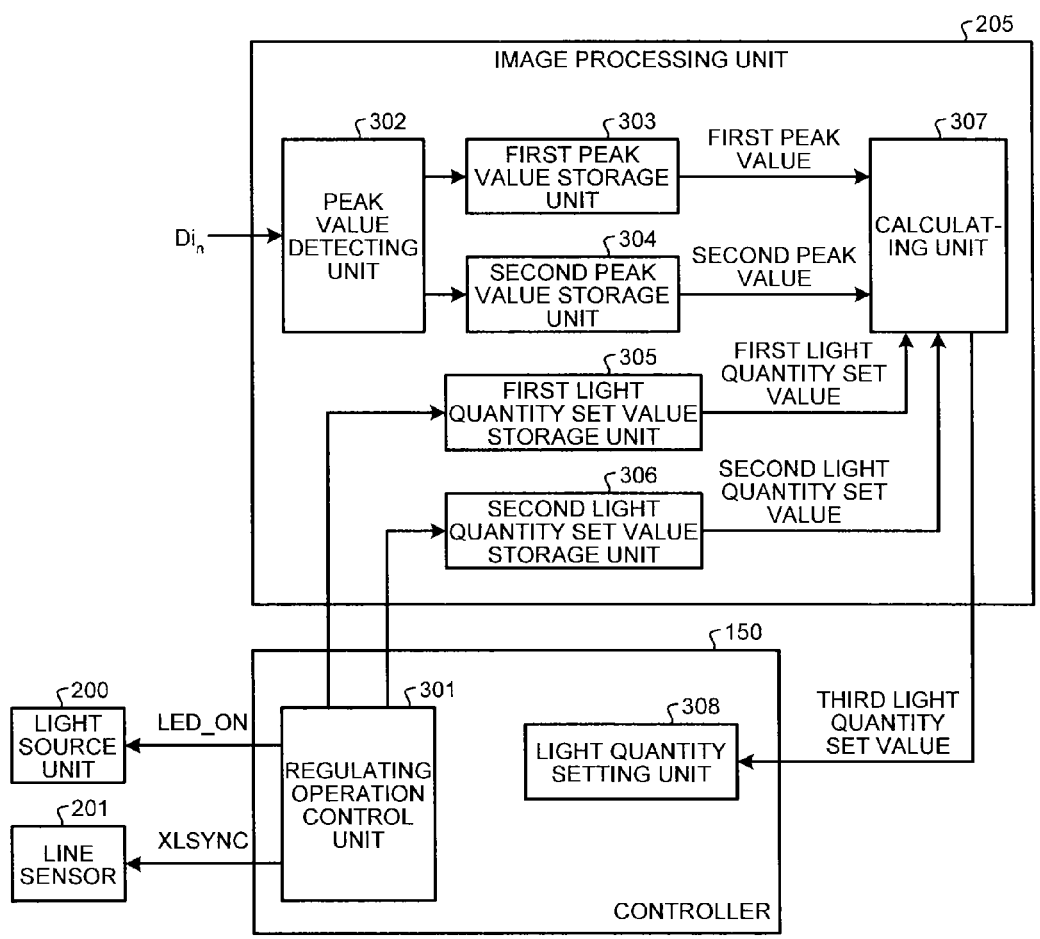
FIG. 6 is a block diagram illustrating a functional structure related to a regulation of a light quantity to be implemented in a controller and an image processing unit.

FIG. 6 is a block diagram illustrating a functional structure related to the regulation of the light quantity which is implemented in the controller 150 and the image processing unit 205. The controller 150 has a regulating operation control unit 301 and a light quantity setting unit 308 as the functional structure related to the regulation of the light quantity. Moreover, the image processing unit 205 includes a peak value detecting unit 302, a first peak value storage unit 303, a second peak value storage unit 304, a first light quantity set value storage unit 305, a second light quantity set value storage unit 306 and a calculating unit 307 as the functional structure related to the regulation of the light quantity. $D_{in}$ in FIG. 6 represents an image signal to be input from the second image reading unit 135 to the image processing unit 205 during the execution of the light quantity regulating operation.

The regulating operation control unit 301 controls the whole light quantity regulating operation for regulating the light quantity of the light source unit 200. When detecting a trigger for the start of the light quantity regulating operation, the regulating operation control unit 301 first sets, to the register, a clock number (hereinafter referred to as a first light quantity set value) for causing the light quantity of the light source unit 200 to be a predetermined first light quantity, thereby outputting, to the light source unit 200, the "LED_ON" corresponding to the first light quantity set value and outputting the "XLSYNC" to the line sensor 201. Consequently, each of the sensor chips of the line sensor 201 reads the reference white member illuminated at the first light quantity, thereby outputting an image signal (hereinafter referred to as a first image signal) of the reference white member illuminated at the first light quantity. The first image signal is AD converted by the A/D converter 203 and is then input to the image processing unit 205. Moreover, the first light quantity set value set by the regulating operation control unit 301 is also input to the image processing unit 205. In the present embodiment, the second reading roller 136 disposed opposite to the second image reading unit 135 is utilized as the reference white member as described above.

When the reference white member illuminated at the first light quantity is ended to be read, moreover, the regulating operation control unit 301 sets, to the register, a clock number (hereinafter referred to as a second light quantity set value) for causing the light quantity of the light source unit 200 to be a second light quantity which is different from the first light quantity, thereby outputting the "LED_ON" corresponding to the second light quantity set value to the light source unit 200 and outputting the "XLSYNC" to the line sensor 201. Consequently, each of the sensor chips of the line sensor 201 reads the reference white member illuminated at the second light quantity and outputs an image signal (hereinafter referred to as a second image signal) of the reference white member illuminated at the second light quantity. The second image signal is AD converted by the A/D converter 203 and is then supplied to the image processing unit 205. Moreover, the second light quantity set value set by the regulating operation control unit 301 is also input to the image processing unit 205.

When the first image signal is input from the second image reading unit 135, the peak value detecting unit 302 detects the peak value of the first image signal. The peak value is the greatest one of values (pixel values) obtained by AD converting pixel outputs of all effective pixels in the main-scanning direction of the line sensor 201. A peak value (hereinafter referred to as a first peak value) of the first image signal detected by the peak value detecting unit 302 is input to a first peak value storage unit 303.

When the second image signal is input from the second image reading unit 135, moreover, the peak value detecting unit 302 detects the peak value of the second image signal. The peak value (hereinafter referred to as a second peak value) of the second image signal detected by the peak value detecting unit 302 is input to a second peak value storage unit 304.

The first peak value storage unit 303 stores therein the first peak value which is detected by the peak value detecting unit 302. Moreover, the second peak value storage unit 304 stores therein the second peak value which is detected by the peak value detecting unit 302.

The first light quantity set value storage unit 305 stores therein the first light quantity set value which is input from the controller 150. Moreover, the second light quantity set value storage unit 306 stores therein the second light quantity set value which is input from the controller 150.

The calculating unit 307 calculates a clock number (hereinafter referred to as a third light quantity set value) for implementing a third light quantity to be a target light quantity based on a difference between the first peak value and the second peak value and a difference between the first light quantity set value and the second light quantity set value. The target light quantity (the third light quantity) is an optimum light quantity for enabling the effective utilization of the dynamic range for the AD conversion through the A/D converter 203, and is a light quantity in which the peak value of the image signal of the reference white member reaches a target value determined depending on a reflectance of the reference white member, for example. The third light quantity set value calculated by the calculating unit 307 is input to the controller 150. A specific example of a method of calculating the third light quantity set value obtained by the calculating unit 307 will be described below.

The light quantity setting unit 308 sets, to the register, the third light quantity set value calculated by the calculating unit 307 as the light quantity set value of the light source unit 200 in document reading. When the light quantity setting unit 308 sets the third light quantity set value to the register, the light quantity regulating operation is ended. After the light quantity regulating operation is ended, the "LED_ON" corresponding to the third light quantity set value set to the register is output from the controller 150 to the light source unit 200 and the document illuminated at the third light quantity is read in the document reading.

Figure 7:
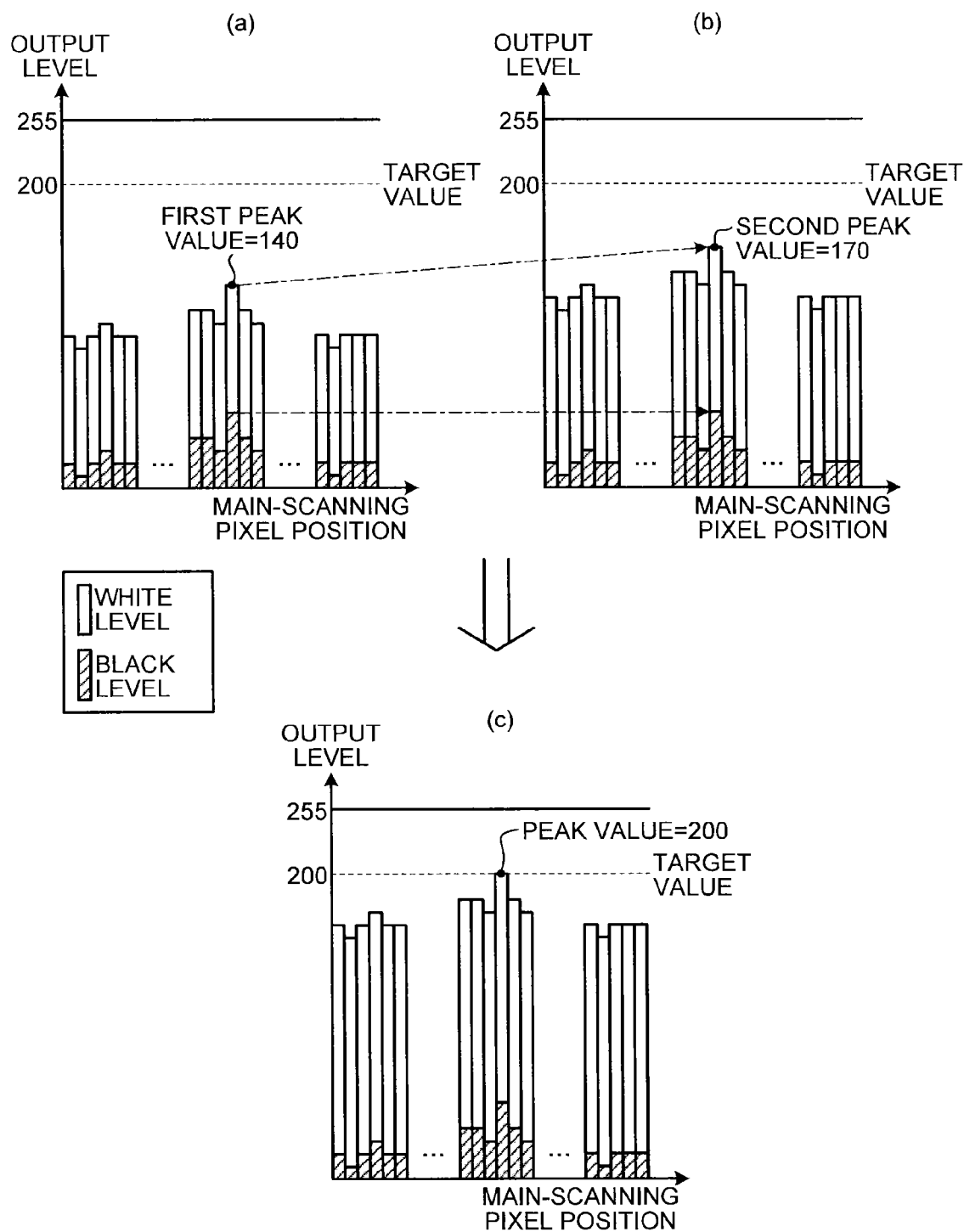
FIG. 7 is a chart for explaining a specific example of a method of calculating a third light quantity.

Next, description will be given to a specific example of the method of calculating the third light quantity through the calculating unit 307. FIG. 7 is a chart for explaining the specific example of the method of calculating the third light quantity. In the example illustrated in FIG. 7, for simplicity of the description, it is assumed that a white level (a signal component) excluding a black level is common in all main scanning pixels in an image signal input from the second image reading unit 135 to the image processing unit 205 during the execution of the light quantity regulating operation.

Illustrated in (a) of FIG. 7 is an example of the first image signal to be input from the second image reading unit 135 to the image processing unit 205, and illustrated in (b) of FIG. 7 is an example of the second image signal to be input from the second image reading unit 135 to the image processing unit 205. It is assumed that the first light quantity set value is 1000 [CLK] and the second light quantity set value is 1500 [CLK]. The first light quantity set value and the second light quantity set value are given from the controller 150 to the image processing unit 205 and the first light quantity set value is stored in the first light quantity set value storage unit 305 and the second light quantity set value is stored in the second light quantity set value storage unit 306.

Moreover, the target value determined depending on the reflectance of the reference white member is 200, and a light quantity in which the peak value of the image signal of the reference white member is 200 is equivalent to the third light quantity. Illustrated in (c) of FIG. 7 is an example of the image signal of the reference white member illuminated at the third light quantity.

When the first image signal illustrated in (a) of FIG. 7 is input to the image processing unit 205, the peak value detecting unit 302 detects, as a first peak value, a pixel value indicative of the highest output level in the pixel values of the all of the main-scanning pixels included in the first image signal. In the example illustrated in (a) of FIG. 7, the first peak value is equal to 140. The first peak value detected by the peak value detecting unit 302 is stored in the first peak value storage unit 303.

When the second image signal illustrated in (b) of FIG. 7 is input to the image processing unit 205, moreover, the peak value detecting unit 302 detects, as a second peak value, a pixel value indicative of the highest output level in the pixel values of all of the main-scanning pixels included in the second image signal. In the example illustrated in (b) of FIG. 7, the second peak value is equal to 170. The second peak value detected by the peak value detecting unit 302 is stored in the second peak value storage unit 304.

The calculating unit 307 calculates the third light quantity set value by the following method through four pieces of information including the first peak value stored in the first peak value storage unit 303, the second peak value stored in the second peak value storage unit 304, the first light quantity set value stored in the first light quantity set value storage unit 305, and the second light quantity set value stored in the second light quantity set value storage unit 306, for example.

It is possible to obtain a variation in an image signal (a white level) per light quantity variation (unit of light quantity variation) corresponding to one cycle of a reference clock from a difference between the first peak value (140 in the present example) and the second peak value (170 in the present example) and a difference between the first light quantity set value (1000 [CLK] in the present example) and the second light quantity set value (1500 [CLK] in the present example) by the following method.

$$(170-140)/(1500-1000) \approx 0.06$$

Accordingly, it is possible to obtain the third light quantity set value for causing the second peak value of the image signal illustrated in (b) of FIG. 7 to be a target value (200 in the present example) as illustrated in (c) of FIG. 7 in the following manner, for example.

$$(200-170)/0.06+1500=2000[CLK]$$

Even if the calculation is carried out by using the first peak value and the first light quantity set value in place of the second peak value and the second light quantity set value, the same result as that described above is obtained.

The third light quantity set value (2000 [CLK] in the present example) calculated by the calculating unit 307 as described above is given from the image processing unit 205 to the controller 150 and is set to the register in the controller 150 by the light quantity setting unit 308.

The target value is determined depending on the reflectance of the reference white member in that an instantaneous pixel value (a non-averaged pixel value) of one pixel does not exceed 255 also in the case in which a document having a reflectance of 100% is read, for example. In the example described above, it is assumed that the reflectance of the reference white member is set to be 79% and the target value is set to be 200 based on $255 \times 0.79 \approx 200$. The method of determining the target value is not restricted thereto but the target value may be determined in consideration of factors other than the reflectance.

Figure 8:
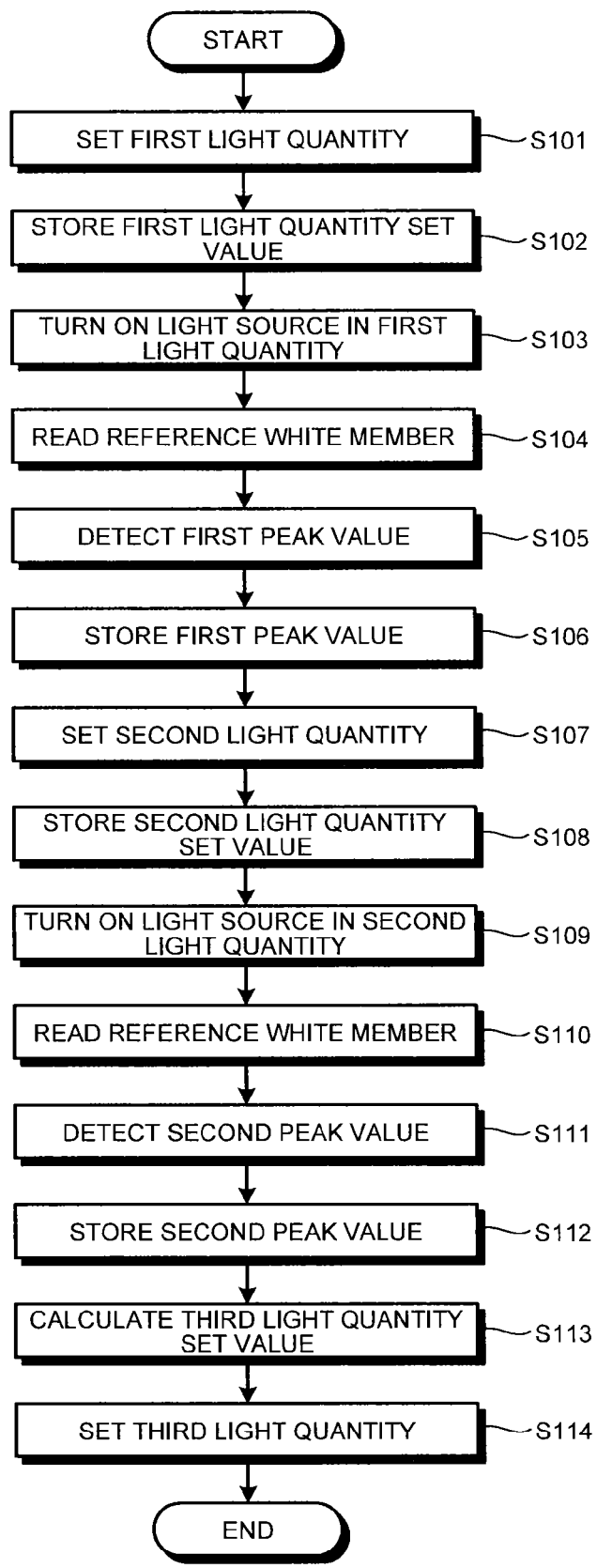
FIG. 8 is a flow chart illustrating a serial procedure for a light quantity regulating operation to be executed in the controller and the image processing unit.

FIG. 8 is a flow chart illustrating a serial procedure for the light quantity regulating operation to be executed in the controller 150 and the image processing unit 205. The light quantity regulating operation illustrated in the flow chart of FIG. 8 is started when the regulating operation control unit 301 detects a trigger for the start of the light quantity regulating operation.

When the light quantity regulating operation is started, the regulating operation control unit 301 of the controller 150 first sets the first light quantity set value to the register (Step S101). The first light quantity set value set by the regulating operation control unit 301 is given to the image processing unit 205 and is stored in the first light quantity set value storage unit 305 in the image processing unit 205 (Step S102).

Next, the regulating operation control unit 301 outputs, to the light source unit 200, the lighting signal ("LED_ON") corresponding to the first light quantity set value, and the light source unit 200 is turned on at the first light quantity (Step S103). Moreover, the regulating operation control unit 301 outputs a timing signal to the line sensor 201 and causes the line sensor 201 to read the reference white member illuminated at the first light quantity (in the present embodiment, the second reading roller 136) (Step S104). A result of the read is input as the first image signal to the image processing unit 205.

Then, the peak value detecting unit 302 of the image processing unit 205 detects, as the first peak value, the pixel value indicative of the highest output level in the pixel values of all of the main scanning pixels included in the first image signal (Step S105). The first peak value detected by the peak value detecting unit 302 is stored in the first peak value storage unit 303 (Step S106).

Thereafter, the regulating operation control unit 301 of the controller 150 sets the second light quantity set value to the register (Step S107). The second light quantity set value set by the regulating operation control unit 301 is given to the image processing unit 205 and is stored in the second light quantity set value storage unit 306 in the image processing unit 205 (Step S108).

Subsequently, the regulating operation control unit 301 outputs, to the light source unit 200, the lighting signal ("LED_ON") corresponding to the second light quantity set value, and the light source unit 200 is turned on at the second light quantity (Step S109). Moreover, the regulating operation control unit 301 outputs a timing signal to the line sensor 201 and causes the line sensor 201 to read the reference white member illuminated at the second light quantity (in the present embodiment, the second reading roller 136) (Step S110). A result of the read is input as the second image signal to the image processing unit 205.

Then, the peak value detecting unit 302 of the image processing unit 205 detects, as the second peak value, the pixel value indicative of the highest output level in the pixel values of all of the main scanning pixels included in the second image signal (Step S111). The second peak value detected by the peak value detecting unit 302 is stored in the second peak value storage unit 304 (Step S112).

Next, the calculating unit 307 calculates the third light quantity set value through the method described above, for example, by using four pieces of information including the first peak value stored in the first peak value storage unit 303, the second peak value stored in the second peak value storage unit 304, the first light quantity set value stored in the first light quantity set value storage unit 305 and the second light quantity set value stored in the second light quantity set value storage unit 306 (Step S113). The third light quantity set value calculated by the calculating unit 307 is given from the image processing unit 205 to the controller 150.

Finally, the light quantity setting unit 308 of the controller 150 sets the third light quantity set value given from the image processing unit 205 to the register in the controller 150 (Step S114) so that a serial light quantity regulating operation is ended.

The light quantity regulating operation described above is executed every time the power supply to the second image reading unit 135 is switched from off to on as an example. In other words, the regulating operation control unit 301 of the controller 150 detects a timing for starting the power supply of to the second image reading unit 135 as a trigger for starting the light quantity regulating operation, and thus starts the light quantity regulating operation.

A light source such as a white LED or a xenon lamp to be used in the light source unit 200 of the second image reading unit 135 is deteriorated sequentially. For this reason, in the case in which the light quantity regulating operation is carried out in a shipment of a product and the light quantity regulating operation is not carried out subsequently, for example, a utilization range might be reduced with the passage of time and picture quality might be gradually deteriorated even if the dynamic range for the AD conversion through the A/D converter 203 can be utilized effectively in an initial stage after the shipment of the product.

On the other hand, when the light quantity regulating operation is carried out every time the power supply of the second image reading unit 135 is switched from off to on, it is possible to maintain the state where the dynamic range for the AD conversion through the A/D converter 203 can be utilized effectively, thereby obtaining an image of high quality continuously even if the sequential deterioration in the light source is caused.

In the case in which the copying machine 1 provided in the second image reading unit 135 has, as an operation mode, an energy saving mode for stopping the power supply to the second image reading unit 135, the light quantity regulating operation may be carried out when the operation mode of the copying machine 1 is transferred to the energy saving mode, and the light quantity regulating operation may not be carried out when the operation mode of the copying machine 1 is returned from the energy saving mode.

In many cases, a user wants to immediately use the copying machine 1 in a situation in which the operation mode of the copying machine 1 is returned from the energy saving mode. For this reason, if the light quantity regulating operation is carried out when the operation mode of the copying machine 1 is returned from the energy saving mode so that the power supply of the second image reading unit 135 is turned ON, it is assumed that a standby time is prolonged until the user can utilize the copying machine 1, thereby causing the user to be stressful.

In order to eliminate the problem, it is effective to execute the light quantity regulating operation in the transition of the operation mode of the copying machine 1 to the energy saving mode and to prevent the execution of the light quantity regulating operation in the return of the operation mode of the copying machine 1 from the energy saving mode. In other words, the regulating operation control unit 301 of the controller 150 detects a command for transferring the operation mode of the copying machine 1 to the energy saving mode for stopping the power supply to the second image reading unit 135 as a trigger for starting the light quantity regulating operation, thereby starting the light quantity regulating operation. After the light quantity regulating operation is ended, the supply of the power to the second image reading unit 135 is blocked.

At this time, in the case in which the energy saving mode serves to also stop the power supply to the controller 150 together with the stop of the power supply to the second image reading unit 135, it is preferable to store the third light quantity set value calculated by the calculating unit 307 in nonvolatile memory provided on an inside or outside of the controller 150 and to read the third light quantity set value from the nonvolatile memory, thereby setting the third light quantity set value to the register in the controller 150 when the operation mode of the copying machine 1 is returned from the energy saving mode.

As described above in detail with reference to the specific examples, according to the present embodiment, the calculating unit 307 calculates the third light quantity set value for implementing the third light quantity to be the target light quantity based on the difference between the first peak value and the second peak value and the difference between the first light quantity set value and the second light quantity set value. When the light quantity setting unit 308 sets the third light quantity set value to the register to read the document, the light source unit 200 illuminates the document at the third light quantity. Irrespective of the magnitude of the black level included in the image signal, accordingly, the light quantity of the light source unit 200 is optimized to increase only the signal component of the image signal within the range in which the digital image signal subjected to the AD conversion is not saturated. Consequently, it is possible to effectively utilize the dynamic range for the AD conversion, thereby enhancing the gradation reproducibility of the digital image signal subjected to the AD conversion to obtain an image of high quality.

Modification

In the above description, there is assumed the case in which the peak value detecting unit 302 receives image signals corresponding to one line from the second image reading unit 135 to detect the greatest value in the pixel values of all of the effective pixels in the main-scanning direction included in the image signals as the first peak value or the second peak value. In the case in which the first peak value or the second peak value is detected from the pixel signals corresponding to one line as described above, however, precision in the detection of the first peak value or the second peak value might be decreased by the influence of a random noise.

Therefore, an averaging circuit may be provided in the peak value detecting unit 302, and the peak value detecting unit 302 may input the image signals corresponding to the lines to obtain an average value of the pixel values every pixel (an average value of the pixel values corresponding to the lines), thereby detecting the greatest one of the acquired average values as the first peak value or the second peak value. Consequently, it is possible to suppress the influence of the random noise, thereby detecting the first peak value or the second peak value with higher precision.

In the above description, moreover, the difference between the first peak value and the second peak value is divided by the difference between the first light quantity and the second light quantity, thereby obtaining the variation in the image signal (the white level) per light quantity variation corresponding to one cycle of the reference clock (the unit light quantity variation). In order to obtain the variation in the image signal per light quantity variation corresponding to one cycle of the reference clock, however, it is not necessary to always use the difference between the first peak value and the second peak value. For example, by predetermining, as a target pixel, one of all of the main scanning pixels which is to be used for the calculation and obtaining a difference between the output level of the target pixel acquired through the read of the reference white member illuminated at the first light quantity and the output level of the target pixel acquired through the read of the reference white member illuminated at the second light quantity to divide the difference by the difference between the first light quantity and the second light quantity, it is also possible to obtain the variation in the image signal per light quantity variation corresponding to one cycle of the reference clock.

Although the reference white member (the second reading roller 136) is used as the reading target of the second image reading unit 135 in the light quantity regulating operation in the above description, moreover, various members in which all regions read by the second image reading unit 135 have a uniform reflectance (a reference member which can be a reference for deciding a change in the image signal corresponding to the change in the light quantity) as well as the reference white member having a high reflectance can be used as the reading target of the second image reading unit 135 in the light quantity regulating operation. In this case, by determining the target value of the peak value in the image signal of the reference member corresponding to the reflectance of the reference member to be used as the reading target of the second image reading unit 135 in the light quantity regulating operation, it is possible to calculate the third light quantity to be a target in the same manner as in the case in which the reference white member is utilized as a reading target.

Second Embodiment

Next, a second embodiment will be described. In the second embodiment, there is taken an example of the case in which a line sensor 201 has three line sensors corresponding to three color components of RGB (Red, Green and Blue). In the second embodiment, basic structures of a copying machine 1, a second image reading unit 135, an image processing unit 205 and a controller 150 are the same as those in the first embodiment. In the second embodiment, a peak value detecting unit 302 of the image processing unit 205 serves to detect a first peak value and a second peak value every three color components of RGB, respectively. Moreover, a calculating unit 307 specifies any of the three color components of RGB which has the smallest difference between the first peak value or the second peak value and a target value, and calculates a third light quantity set value corresponding to the color component. Only characteristic portions in the second embodiment will be described below and repetitive description of the first embodiment will be omitted.

Figure 9:
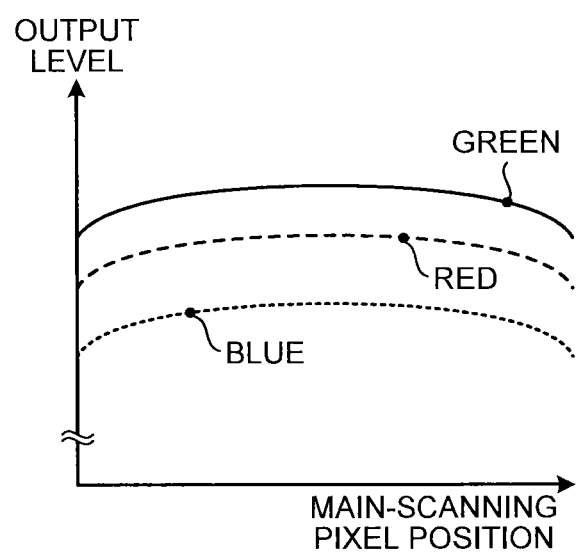
FIG. 9 is a chart illustrating an example of an image signal obtained by reading a reference white member through a second image reading unit according to a second embodiment.

FIG. 9 illustrates an example of an image signal obtained by reading a reference white member through the second image reading unit 135 according to the present embodiment. Even if a white light is irradiated in a predetermined light quantity from a light source unit 200 in the case in which the line sensor 201 of the second image reading unit 135 has three line sensors corresponding to the three color components of RGB, an output level of each color component of an image signal obtained by reading the reference white member is non-uniform due to a difference in a spectral sensitivity characteristic of the sensor for each color component or the like when a decomposition into each color component is carried out. In the example illustrated in FIG. 9, an output level of the image signal having the G component in the image signals having the respective color components of RGB has the highest output level, an output level of the image signal having the R component is the second highest, and the output level of the image signal having the B component is the lowest.

In this case, if a third light quantity to set the first peak value or the second peak value of the B component to be a target value is calculated and a light quantity of the light source unit 200 is set to be the third light quantity, for example, the output of the G component or the R component might be saturated and it is impossible to obtain an output which strictly reflects a reflectance of a document when the document including a portion having a high reflectance is read.

In the present embodiment, therefore, the calculating unit 307 of the image processing unit 205 calculates the third light quantity by the following method.

A first peak value is represented by PK1_*, a second peak value is represented by PK2_*, a first light quantity set value is represented by $\alpha 1$, a second light quantity set value is represented by $\alpha 2$, a target value is represented by TARGET_*, a variation in an image signal per light quantity variation corresponding to one cycle of a reference clock is represented by $\Delta W\_*$, a light quantity regulation value (a regulation value of a light quantity such that the first peak value or the second peak value becomes a target value) is represented by $\Delta \alpha\_*$, and a light quantity set value of a third light quantity is represented by $\alpha 3$. The symbol "*" indicates the R component, the G component or the B component.

In the present embodiment, first of all, the variation $\Delta W\_*$ in the image signal per light quantity variation corresponding to one cycle of the reference clock is calculated from the first peak value PK1_*, the second peak value PK2_*, the first light quantity set value $\alpha 1$ and the second light quantity set value $\alpha 2$ in the following manner.

$$\Delta W\_* = (PK2\_* - PK1*)/(\alpha 2 - \alpha 1)$$

Next, the light quantity regulation value $\Delta \alpha\_*$ for causing the second peak value to be the target value is calculated in the following manner.

$$\Delta \alpha\_* = (TARGET\_* - PK2\_*)/\Delta W\_*$$

Subsequently, the smallest one ($\Delta \alpha_{min}$) of the light quantity regulation values $\Delta \alpha\_*$ obtained for the respective color components, that is, $\Delta \alpha\_R$, $\Delta \alpha\_G$ and $\Delta \alpha\_B$ is selected and the light quantity set value $\alpha 3$ of the third light quantity is finally obtained as follows.

$$\alpha 3 = \alpha 2 + \Delta \alpha_{min}$$

Although the calculation is carried out to cause the second peak value to be the target value in the example, the same result as that described above can be obtained even if the calculation for causing the first peak value to be the target value in place of the second peak value is carried out.

As described above, in the present embodiment, the calculating unit 307 specifies any of the three color components of RGB which has the smallest difference between the first peak value or the second peak value and the target value, and calculates the third light quantity set value corresponding to the color component. Therefore, it is possible to prevent an output of any of the color components in the image signals obtained by reading a document from saturating and it is impossible to obtain an output which strictly reflects the reflectance of the document.

Third Embodiment

Next, a third embodiment will be described. In the third embodiment, a reference white member illuminated in a third light quantity is further read in a light quantity regulating operation, and an image signal (hereinafter referred to as a third image signal) of the reference white member illuminated at the third light quantity is thus acquired. Then, a peak value (hereinafter referred to as a third peak value) of the third image signal is detected and decides whether the third peak value thus detected exceeds a target value or not. If the third peak value exceeds the target value, a fourth light quantity set value for implementing a fourth light quantity to be a new target light quantity is calculated based on a difference between a second peak value and the third peak value and a difference between a second light quantity and the third light quantity. Basic structures of a copying machine 1 and a second image reading unit 135 according to the third embodiment are the same as those in the first embodiment. Only characteristic portions in the third embodiment will be described below and repetitive description of the first embodiment will be omitted.

In the first embodiment, the description has been given by taking, as an example, the case in which the white level (the light signal component) of the image signal obtained by reading the reference white member is common to all of main scanning pixels. This assumes the case in which the light source unit 200 can uniformly illuminate the whole reading region of the reference white member without an illuminance unevenness. However, it is hard to actually carry out the uniform illumination without the illuminance unevenness, and the white level of the image signal causes a variation depending on the pixel in many cases. Moreover, the black level included in the image signal is not constant through all of the main scanning pixels but causes a variation depending on the pixel as described above.

For this reason, a pixel position in which the first peak value is output and a pixel position in which the second peak value is output are different from each other in rare cases. As a result, the third light quantity cannot be properly calculated by the method described in the first embodiment in some cases.

Figure 10:
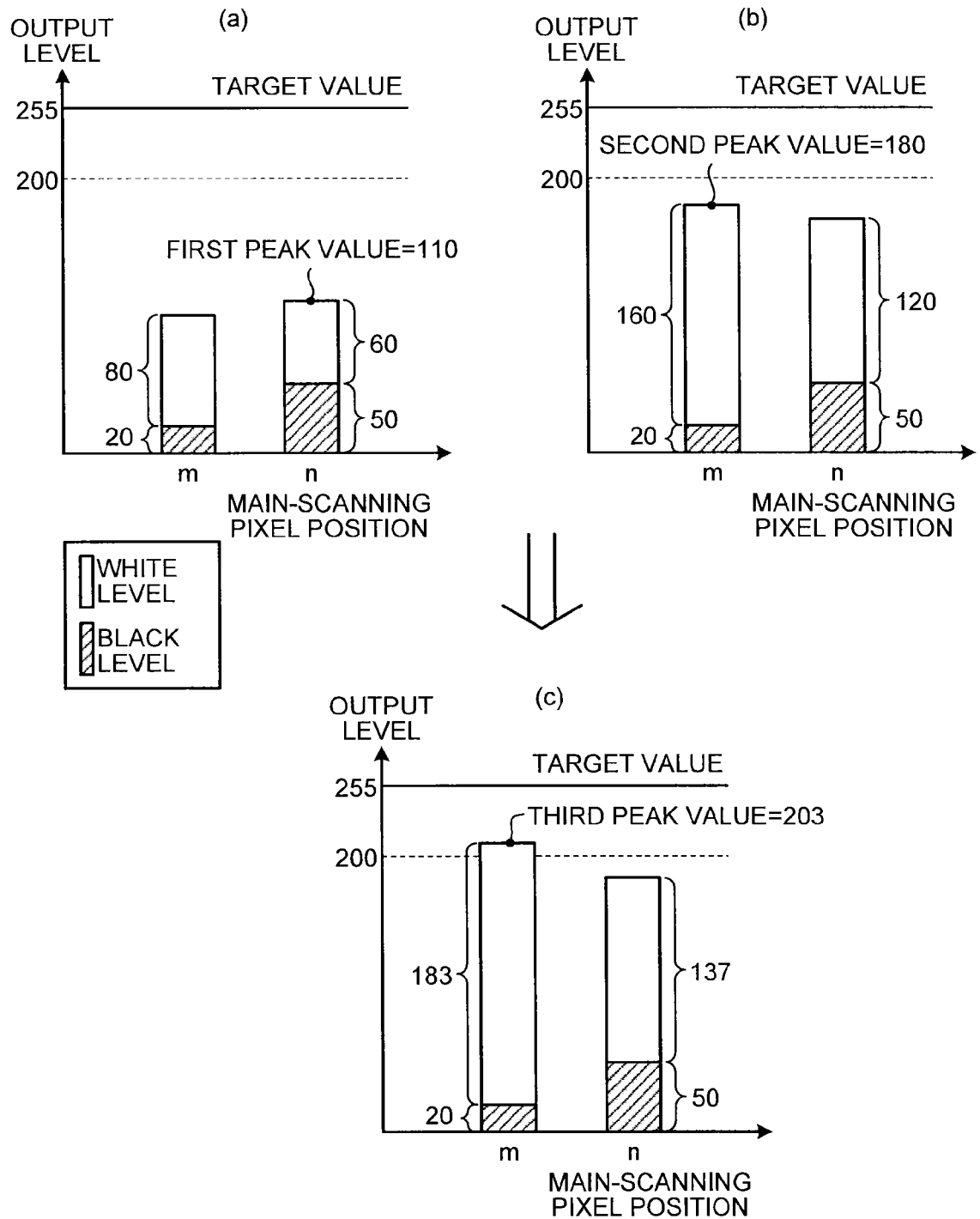
FIG. 10 is a chart for explaining the case in which a third light quantity cannot be properly calculated.

FIG. 10 illustrates the case in which the third light quantity cannot be calculated properly as described above. In the example illustrated in FIG. 10, for simplicity of the description, there are illustrated only two of the outputs in all of the main scanning pixels included in the image signal which particularly have higher output levels.

Illustrated in (a) of FIG. 10(a) is an output of a pixel m and an output of a pixel n in a first image signal input from the second image reading unit 135 to an image processing unit 205, and illustrated in (b) of FIG. 10 is an output of a pixel m and an output of a pixel n in a second image signal input from the second image reading unit 135 to the image processing unit 205. The output of the pixel m in (a) of FIG. 10 has a white level component of 80 and a black level component of 20, and the output of the pixel n in (a) of FIG. 10 has a white level component of 60 and a black level component of 50. Moreover, the output of the pixel m in (b) of FIG. 10 has a white level component of 160 and a black level component of 20, and the output of the pixel n in (b) of FIG. 10 has a white level component of 120 and a black level component of 50. It is assumed that a first light quantity set value is 1000 [CLK] and a second light quantity set value is 2000 [CLK]. Moreover, a target value determined corresponding to a reflectance of a reference white member is 200.

In the case of the example illustrated FIG. 10, the output of the pixel n in (a) of FIG. 10 has a first peak value which is equal to 110. Moreover, the output of the pixel m in (b) of FIG. 10 has a second peak value which is equal to 180.

In the same manner as in the first embodiment, a variation in an image signal (a white level) per light quantity variation (unit of light quantity variation) corresponding to one cycle of a reference clock is calculated as follows based on a difference between the first peak value (110 in the present example) and the second peak value (180 in the present example) and a difference between the first light quantity set value (1000 [CLK] in the present example) and the second light quantity set value (2000 [CLK] in the present example).

$$(180-110)/(2000-1000) \approx 0.07$$

Accordingly, a third light quantity set value is calculated as follows in the same manner as in the first embodiment.

$$(200-180)/0.07+2000=2286 \text{ [CLK]}$$

The third light quantity set value (2286 [CLK]) obtained as described above is 2.286 times as great as the first light quantity set value (1000 [CLK]). Accordingly, the output (the third peak value) of the pixel m in the image signal of the reference white member illuminated at the third light quantity is $80 \times 2.286 + 20 \approx 203$, and exceeds 200 in which the third peak value is equal to a target value as illustrated in (c) of FIG. 10. Thus, the third light quantity in which the third peak value exceeds the target value is not proper for the light quantity of the light source unit 200. In other words, when there is read a document including a portion having a high reflectance under an illumination at the third light quantity, an output corresponding to the portion having the high reflectance is saturated.

In the present embodiment, therefore, the reference white member illuminated at the third light quantity is read to acquire the third image signal, thereby determining whether the third peak value exceeds the target value or not in a light quantity regulating operation. If the third peak value exceeds the target value, the fourth light quantity set value for implementing the fourth light quantity to be a new target light quantity is calculated based on the difference between the second peak value and the third peak value and the difference between the second light quantity set value and the third light quantity set value.

Figure 11:
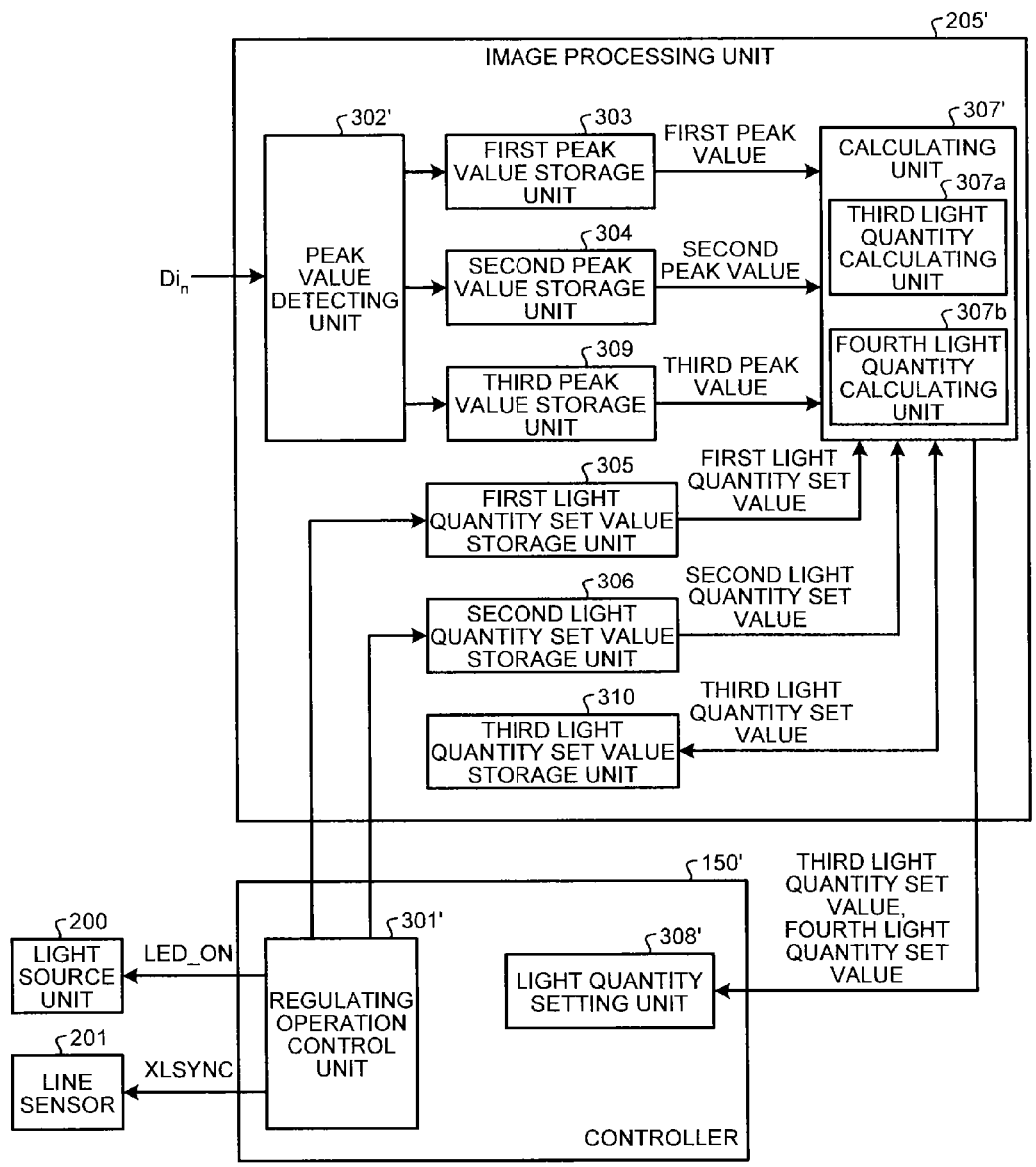
FIG. 11 is a block diagram illustrating a functional structure related to a light quantity regulation to be implemented in a controller and an image processing unit according to a third embodiment.

FIG. 11 is a block diagram illustrating a functional structure related to a light quantity regulation implemented in a controller 150' and an image processing unit 205' according to the present embodiment. The controller 150' includes a regulating operation control unit 301' and a light quantity setting unit 308' as the functional structure related to the light quantity regulation. Moreover, the image processing unit 205' includes, as the functional structure related to the light quantity regulation, a peak value detecting unit 302', a first peak value storage unit 303, a second peak value storage unit 304, a first light quantity set value storage unit 305, a second light quantity set value storage unit 306, a third peak value storage unit 309, a third light quantity set value storage unit 310 and a calculating unit 307'. The first peak value storage unit 303, the second peak value storage unit 304, the first light quantity set value storage unit 305 and the second light quantity set value storage unit 306 are the same as those in the first embodiment.

The regulating operation control unit 301' controls the whole light quantity regulating operation in the same manner as the regulating operation control unit 301 according to the first embodiment. When the light quantity setting unit 308' sets, to the register, a clock number (the third light quantity set value) for implementing the third light quantity, the regulating operation control unit 301' according to the present embodiment outputs "LED_ON" corresponding to the third light quantity set value to the light source unit 200, and furthermore, outputs "XLSYNC" to the line sensor 201 to read the reference white member illuminated at the third light quantity.

In the same manner as the regulating operation control unit 301 according to the first embodiment, the peak value detecting unit 302' detects the first peak value and inputs the first peak value to the first peak value storage unit 303 when the first image signal is input from the second image reading unit 135, and inputs the second peak value to the second peak value storage unit 304 when the second image signal is input from the second image reading unit 135. Moreover, the peak value detecting unit 302' detects the third peak value when the third image signal is input from the second image reading unit 135. The peak value detecting unit 302' includes a comparison circuit, and decides whether the third peak value exceeds the target value or not by using the comparison circuit when detecting the third peak value. If the peak value detecting unit 302' decides that the third peak value exceeds the target value, the third peak value is input to the third peak value storage unit 309.

The third peak value storage unit 309 stores therein the third peak value detected by the peak value detecting unit 302'. Moreover, the third light quantity set value storage unit 310 stores therein a set value (the third light quantity set value) of the third light quantity calculated by a third light quantity calculating unit 307a of the calculating unit 307'.

The calculating unit 307' has the third light quantity calculating unit 307a and a fourth light quantity calculating unit 307b. In the same manner as the calculating unit 307 according to the first embodiment, the third light quantity calculating unit 307a calculates the third light quantity set value by using four pieces of information including the first peak value stored in the first peak value storage unit 303, the second peak value stored in the second peak value storage unit 304, the first light quantity set value stored in the first light quantity set value storage unit 305, and the second light quantity set value stored in the second light quantity set value storage unit 306. The third light quantity set value calculated by the third light quantity calculating unit 307a is given to the controller 150' and is input to the third light quantity set value storage unit 310, and is thus stored in the third light quantity set value storage unit 310.

The fourth light quantity calculating unit 307b functions when the third peak value is decided to exceed the target value by the peak value detecting unit 302' and is thus stored in the third peak value storage unit 309. The fourth light quantity calculating unit 307b calculates the fourth light quantity set value for implementing the fourth light quantity to be a new target light quantity by using four pieces of information including the second peak value stored in the second peak value storage unit 304, the third peak value stored in the third peak value storage unit 309, the second light quantity set value stored in the second light quantity set value storage unit 306, and the third light quantity set value stored in the third light quantity set value storage unit 310. Referring to a method of calculating the fourth light quantity set value through the fourth light quantity calculating unit 307b, the first peak value, the second peak value, the first light quantity set value and the second light quantity set value are changed into the second peak value, the third peak value, the second light quantity set value and the third light quantity set value respectively, and a basic calculating method is the same as the method of calculating the third light quantity set value through the third light quantity calculating unit 307a, that is, the method described in the first embodiment.

When the third light quantity set value is calculated by the third light quantity calculating unit 307a of the calculating unit 307' and is given to the controller 150', the light quantity setting unit 308' sets the third light quantity set value to the register in the controller 150'. When the fourth light quantity set value is calculated by the fourth light quantity calculating unit 307b of the calculating unit 307' and is given to the controller 150', moreover, the light quantity setting unit 308' sets the fourth light quantity set value into the register of the controller 150'.

Figure 12:
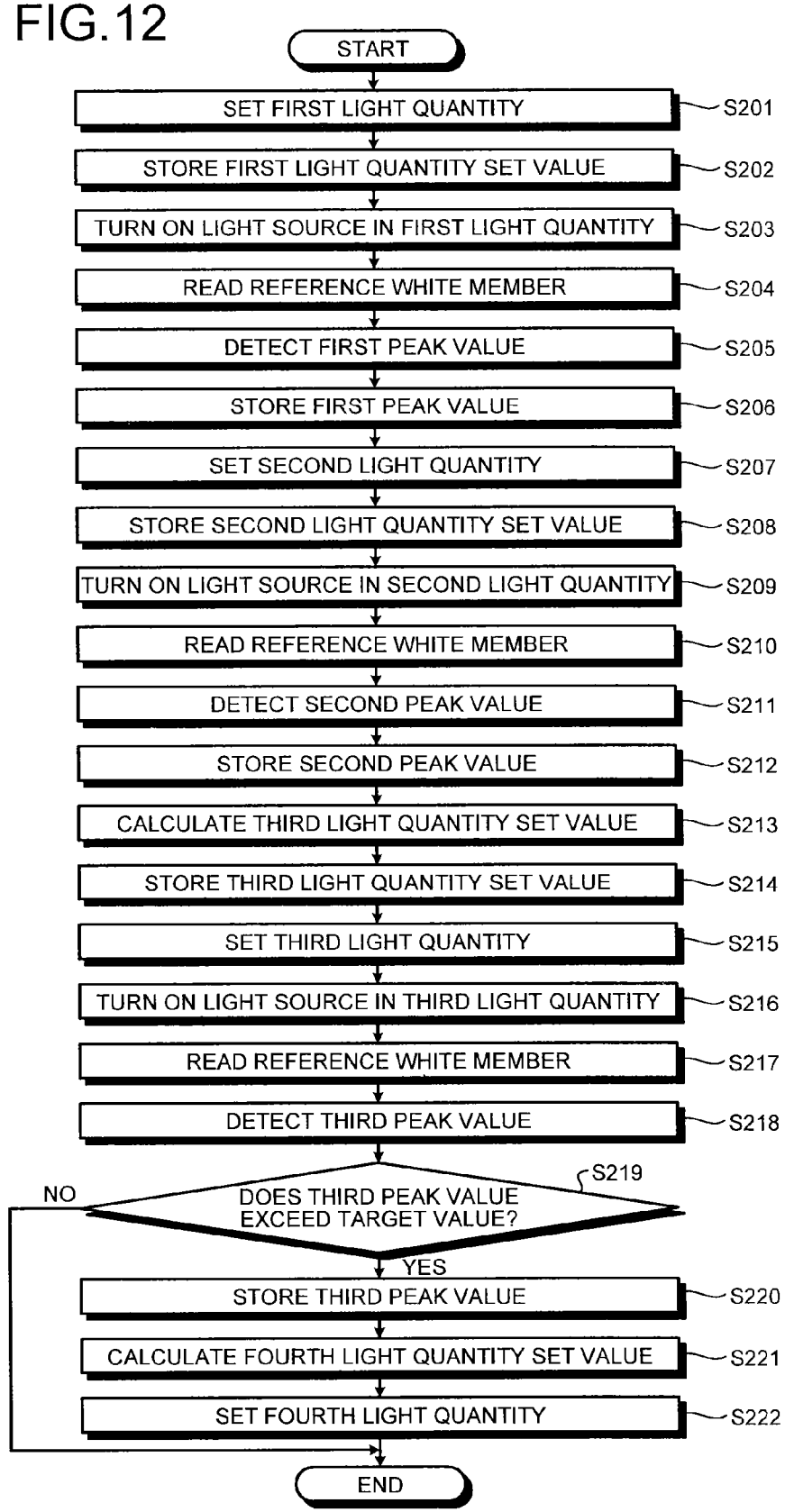
FIG. 12 is a flow chart illustrating a serial procedure for a light quantity regulating operation according to the third embodiment which is to be executed by the controller and the image processing unit.

FIG. 12 is a flow chart illustrating a serial procedure for the light quantity regulating operation according to the present embodiment which is to be executed in the controller 150' and the image processing unit 205'. The light quantity regulating operation illustrated in the flow chart of FIG. 12 is started when the regulating operation control unit 301' detects a trigger for starting the light quantity regulating operation. Since processing of Steps S201 to S213 in FIG. 12 are the same as those of the Steps S101 to S113 in FIG. 8, description will be omitted.

In the present embodiment, when the third light quantity set value is calculated by the third light quantity calculating unit 307a of the calculating unit 307', the third light quantity set value is stored in the third light quantity set value storage unit 310 (Step S214). Moreover, the light quantity setting unit 308' of the controller 150' sets the third light quantity set value to the register (Step S215). Then, the regulating operation control unit 301' outputs a lighting signal ("LED_ON") corresponding to the third light quantity set value to the light source unit 200 and turns on the light source unit 200 at the third light quantity (Step S216). Moreover, the regulating operation control unit 301' outputs a timing signal to the line sensor 201 to read the reference white member illuminated at the third light quantity (Step S217). A result of the read is input as a third image signal to the image processing unit 205'.

Next, the peak value detecting unit 302' of the image processing unit 205' detects, as the third peak value, any of pixel values in all of main scanning pixels included in the third image signal which is indicative of the highest output level (Step S218). Then, the peak value detecting unit 302' decides whether the third peak value thus detected exceeds the target value determined depending on the reflectance of the reference white member or not (Step S219). If the third peak value does not exceed the target value (Step S219: No), the light quantity regulating operation is exactly ended. In other words, the third light quantity set value is maintained to be set into the register in the controller 150' in this case, and the "LED_ON" corresponding to the third light quantity set value set to the register is output from the controller 150' to the light source unit 200 in the read of the document after the light quantity regulating operation is ended. Thus, the document illuminated at the third light quantity is read.

On the other hand, if the third peak value exceeds the target value (Step S219: Yes), the third peak value detected by the peak value detecting unit 302 is stored in the third peak value storage unit 309 (Step S220). Then, the fourth light quantity calculating unit 307b of the calculating unit 307' calculates the fourth light quantity set value by using four pieces of information including the second peak value stored in the second peak value storage unit 304, the third peak value stored in the third peak value storage unit 309, the second light quantity set value stored in the second light quantity set value storage unit 306 and the third light quantity set value stored in the third light quantity set value storage unit 310 (Step S221). The fourth light quantity set value calculated by the fourth light quantity calculating unit 307b of the calculating unit 307' is given from the image processing unit 205' to the controller 150'.

Finally, the light quantity setting unit 308' of the controller 150' sets the fourth light quantity set value given from the image processing unit 205' to the register in the controller 150' (Step S222), and the serial light quantity regulating operation is thus ended.

As described above, in the present embodiment, the reference white member illuminated at the third light quantity is also read in the light quantity regulating operation. The peak value detecting unit 302' detects the third peak value to decide whether the third peak value exceeds the target value or not. If the third peak value exceeds the target value, the fourth light quantity calculating unit 307b of the calculating unit 307' uses the four pieces of information including the second peak value, the third peak value, the second light quantity set value and the third light quantity set value to calculate the fourth light quantity set value for implementing the fourth light quantity to be a new target light quantity. According to the present embodiment, therefore, even if a white level of an image signal obtained by reading the reference white member has a variation for each pixel, it is possible to optimize the light quantity of the light source unit 200 in order to enable an effective utilization of a dynamic range for an AD conversion, thereby enhancing a gradation reproducibility of a digital image signal subjected to the AD conversion. Thus, it is possible to obtain an image of high quality.

According to the embodiments, irrespective of the magnitude of the black level included in the image signal, the light quantity of the light source is optimized and only the signal component of the image signal is increased within a range in which the digital image signal subjected to the AD conversion is not saturated so that the dynamic range for the AD conversion can be utilized effectively. Accordingly, it is possible to produce an effect capable of enhancing a gradation reproducibility of the digital image signal subjected to the AD conversion, thereby obtaining an image of high quality.

Although the specific embodiments of the present invention have been described above, the present invention is not exactly restricted to the embodiments but various changes and modifications can be made without departing from the gist of the present invention in an executing stage and the present invention can be made concrete. For instance, although the embodiments are examples in which the present invention is applied to the second image reading unit 135 of the CIS type, the present invention can be applied to image reading apparatuses of various types in addition to the image reading apparatus of the CIS type. Accordingly, the present invention can also be applied to the first image reading unit 131 as well as the second image reading unit 135 of the copying machine 1.

Although the embodiments are examples in which the present invention is applied to the copying machine 1, moreover, the present invention can widely be applied to image forming apparatuses having various configurations, that is, an image forming apparatus including an image reading apparatus for optically reading a document such as a facsimile device or a copying machine.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a light source;
an image sensor configured to output an image signal of an object illuminated by the light source;
a first calculating unit configured to calculate a third light amount based on a difference between a first image signal output from the image sensor when the light source illuminates a reference member as the object at a first light quantity and a second image signal output from the image sensor when the light source illuminates the reference member at a second light quantity and a difference between the first light quantity and the second light quantity; and
a light quantity setting unit configured to set a light quantity at which the light source illuminates a document as the object to the third light quantity,
wherein the first calculating unit calculates the third light quantity based on a difference between a peak value of the first image signal and a peak value of the second image signal and the difference between the first light quantity and the second light quantity, and
wherein the first calculating unit divides the difference between the peak value of the first image signal and the peak value of the second image signal by the difference between the first light quantity and the second light quantity to obtain a variation in an image signal per unit of light quantity variation, divides a difference between the peak value of the first image signal or the peak value of the second image signal and a predetermined target value by the variation in the image signal per unit of light quantity variation to obtain a necessary light quantity variation such that the peak value of the first image signal or the peak value of the second image signal becomes the target value, and adds the light quantity variation thus obtained to the first light quantity or the second light quantity to calculate the third light quantity.

2. The image reading apparatus according to claim 1, wherein the image sensor outputs the first image signal and the second image signal for each color component of RGB, and
the first calculating unit calculates the third light quantity corresponding to one of the color components of RGB that has the smallest difference between the peak value of the first image signal or the peak value of the second image signal and the target value.

3. The image reading apparatus according to claim 1, further comprising a second calculating unit configured to calculate a fourth light quantity based on a difference between the second image signal and a third image signal output from the image sensor when the light source illuminates the reference member at a third light quantity and a difference between the second light quantity and the third light quantity if the third image signal exceeds a target value, wherein the light quantity setting unit changes setting of the light quantity at which the light source illuminates the document as the object into the fourth light quantity.

4. The image reading apparatus according to claim 1, wherein
the image sensor includes a plurality of sensor chips, and
the image signal is generated by synthesizing outputs of the sensor chips.

5. The image reading apparatus according to claim 1, wherein the image sensor is a line sensor that includes a plurality of pixels arranged in a main scanning direction and outputs image signals indicating pixel values of the pixels every line cycle, and
each of the peak value of the first image signal and the peak value of the second image signal is the greatest one of average values of pixel values output from the image sensor in a plurality of line cycles.

6. The image reading apparatus according to claim 5, wherein the image sensor outputs the first image signal and the second image signal for each color component of RGB, and
the first calculating unit calculates the third light quantity corresponding to one of the color components of RGB that has the smallest difference between the peak value of the first image signal or the peak value of the second image signal and the target value.

7. An image forming apparatus comprising:
the image reading apparatus according to claim 1; and
an image forming unit configured to form an image based on the image signal of the document output from the image sensor of the image reading apparatus.

8. The image forming apparatus according to claim 7, wherein the first calculating unit calculates the third light quantity every time a power supply of the image reading apparatus is switched from off to on.

9. The image forming apparatus according to claim 7, wherein the image forming apparatus has an energy saving mode for stopping power supply to the image reading apparatus, and
the first calculating unit calculates the third light quantity when the operation mode of the image forming apparatus is transferred to the energy saving mode, and does not calculate the third light quantity when the operation mode of the image forming apparatus is returned from the energy saving mode.

* * * * *